Aug. 16, 1955     J. M. STINCHFIELD     2,715,666
ELECTRIC STRAIN GAGE
Filed Sept. 19, 1952
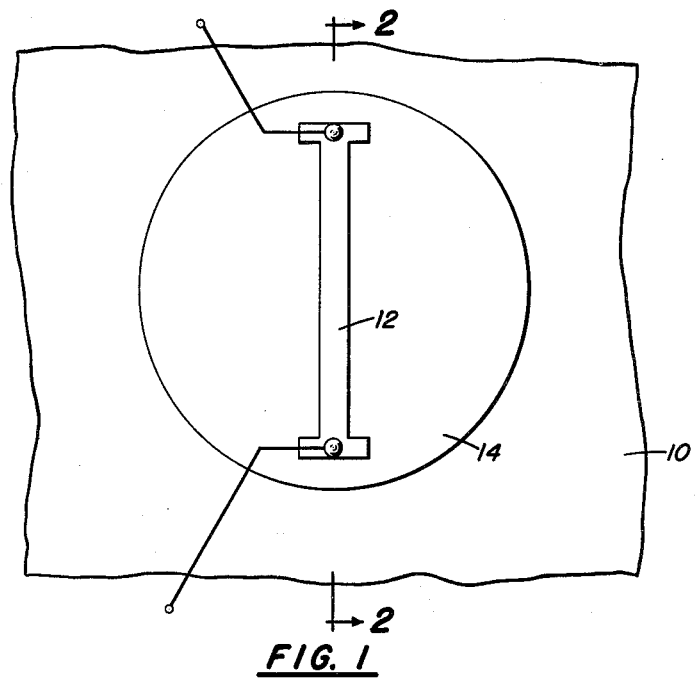
FIG. I
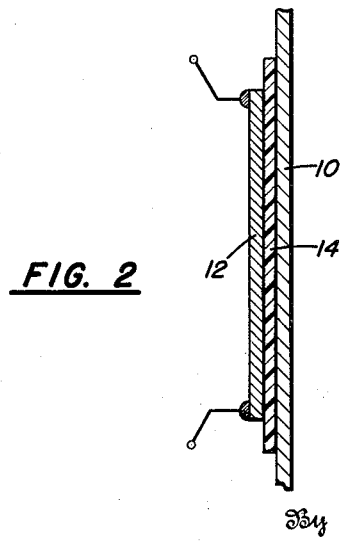
FIG. 2
Inventor
J. MAXWELL STINCHFIELD
By F.J. Schmitt
Walter S. Paul.
Attorneys

United States Patent Office 2,715,666
Patented Aug. 16, 1955

2,715,666

ELECTRIC STRAIN GAGE

John Maxwell Stinchfield, Bethesda, Md.

Application September 19, 1952, Serial No. 310,575

6 Claims. (Cl. 201—63)

(Granted under Title 35, U. S. Code (1952), sec. 266)

The invention described herein may be manufactured and used by or for the Government of the United States of America for governmental purposes without the payment of any royalties thereon or therefor.

This invention relates to new methods of making highly sensitive strain gages, and to improvements in such gages.

An object of this invention is to teach a method of making unique strain gages by uniting with a work piece surface a film of insulating material and uniting a film of strain sensitive material onto the insulation, preferably by evaporation under vacuum so that no cement is required, the atomic forces between layers or films being sufficient to form the necessary bond.

Another object of the invention is to provide a novel strain gage that is far more sensitive than those known today, and which is so thin that it does not contribute appreciably to thickness, size, mass and strength of the member in which strain is being measured.

Other objects and features will become apparent in following the description.

In the drawing:

Fig. 1 is an enlarged front view of a strain gage applied to a work piece, and

Fig. 2 is a sectional view taken on the plane of line 2—2 of Fig. 1 and in the direction of the arrows, the thicknesses of the gage elements being greatly exaggerated.

It has been known for a long time that when a conductor is placed in tensile or compressive stress, its electrical resistance changes. Resistance strain gages utilize this change in electrical resistance, to obtain a measure of strain in a member to which the gage is attached.

The strain gage thus is used as a primary element for measuring a small change in the dimensions of the surface to which it is attached. The percentage change in electrical resistance is proportional to strain or displacement. Thus a suitable instrument actuated by the change in electrical resistance of the strain gage will show not only strain or displacement, but also any other variable which can be converted into strain or displacement.

In the past one of the most satisfactory types of resistance strain gages has consisted of fine wire of approximately one thousandth of one inch diameter by such a length (roughly five inches) as to give a resistance of the desired value (say 120 ohms). This fine wire is wound into some form such that most of its length is in parallel with the strain which is to be measured. It may, for example, be formed into a grid, or it may be wound around a circular member or take many other shapes suitable for strain measurements.

These strain gages may be connected in various ways into an electrical circuit. For example, the strain gage may form one or more arms of a four arm resistance bridge network. When the strain gage is subjected to a strain its resistance is changed and the resulting unbalance in the bridge network is indicated by electrical instruments. In properly designed equipment the electrical output (amplified or not) is proportional to the strain.

When such a strain gage is cemented onto a thin diaphragm for example, the layers of cement, insulation (such as cigarette paper, plastic, or other cement), and strain gage resistance wire, all introduce undesirable effects changing the diaphragm characteristics and introducing sources of error. The exact transmission of the strain in the diaphragm, to the strain gage, through the elastic bonding cement, is also a problem.

The strain gage which I have invented consists of microscopically thin layers of insulation and strain gage metal. This new type of strain gage differs from previously known types in many ways. It is, to an unusual degree, intimately associated with the surface in which the strain is being measured. This is true to such an extent that it is not necessary to use cement to secure a good bond between the strain gage and the surface to which it is attached. Atomic forces alone are sufficient.

This new strain gage can consist of miscroscopic layers (say layers 50 or more molecules thick) of electrically conducting (strain sensitive) and electrically insulating materials, so thin that the strain gage will not contribute appreciably to the thickness, size, mass, and strength of the member in which strain is being measured. When applied to thin, small, or fragile members, such as work piece 10, the characteristics of these members are not altered by the presence of the strain gage. Also, on large or heavy members this new strain gage tends to conform closely to the true properties of the member.

In this new strain gage, the one thousandth inch diameter strain gage wire, for example, is replaced by a film 12 of metal of suitable low temperature coefficient alloy, and the wire insulation is replaced by a thin film 14 of insulating material. The dimensions of these films can differ greatly from any previous types of strain gages without loss of sensitivity and with improved characteristics as regards smaller mass, closer adherence to the surface, and less temperature error.

The width of this new strain gage can be increased in proportion to the decrease in thickness. The resulting greater area of contact between this strain gage and the surface to which it is attached as well as the greater surface exposed to the air or other cooling medium, both contribute to an increased power handling ability with resulting greater strain gage power output and less temperature rise.

The length of this new strain gage can also be changed without loss of sensitivity, except that the reduced area of contact with the surface limits the maximum output.

For example, this new type of strain gage may be one millimeter wide, by ten millimeters long, by about one and one-half millionth of an inch thick, for a 120 ohm strain gage. Also these dimensions can be changed conveniently to fit small members on which the strain gage is located. The thickness will then change in proportion to the change in length, the width and resistance of the strain gage could remain constant.

These thin layers of insulation and metal can be applied directly to the member being tested for strain without the use of any form of cement by a number of different processes (for example, by the evaporation of the materials in vacuum) or the strain gage can be formed on a thin film (such as thin cellophane) which is later intimately attached to the member. In the latter case a solvent, such that softens the under surface of the cellophane sufficiently to form its own bond to the member may be used.

I have found that the temperature errors associated with a cemented resistance wire strain gage were decreased when the thickness of the diaphragm or other work piece, to which it was attached, was increased relative to the thickness of the strain gage and cement.

Both the insulating layers and the conducting layers of the strain gage can be formed, directly on the surface on which the strain is to be measured, by simply evaporating the materials in vacuum so that they deposit on the surface.

The thickness of the deposits can be easily controlled by simply controlling the temperature of the source so that more or less material is evaporated. Another method of control, especially suitable for alloys, when it is necessary to maintain exact composition, consists in dropping small particles of the alloy on a source heated to such a high temperature that all of the components of the alloy evaporate simultaneously. Then thickness of deposit is controlled by control of the rate of particle dropping onto the high temperature source. Also, the technique of evaporation from two or more sources such as, for example, the simultaneous evaporation of copper and nickel to form the alloy of approximately 45 percent nickel and 55 per cent copper on the surface can be used.

When sufficient precautions are taken, relative to good vacuum and cleanliness of parts, extremely adherent deposits are formed. Moreover, the evaporated strain gage can be protected by an evaporated layer of dielectric material. Another specific example of an operative insulation film is phenolaldehyde which has been thinly applied to the surface and subjected to a baking temperature of 300 degrees Fahrenheit to give a black, hard film of good insulation with less than one thousandth inch thickness.

What is claimed is:

1. In a work piece, a strain gage adapted to be connected to a surface area of the work piece, said strain gage consisting of a film of insulating material approximately fifty molecules thick adapted to be united by atomic forces only to said surface area of the work piece, and a film of electrically conductive material united with said insulating material on the surface thereof opposite to the surface applicable to the work piece.

2. The combination of claim 1 and said conductive material film being of a thickness approximately equal to the thickness of the insulating material so that due to the thinness of the gage and lack of any gluing agent, the characteristics of even the most fragile or thin work pieces are unaltered.

3. The combination of claim 1 with said electrically conductive film including at least two different metals.

4. The method of making a strain gage directly on a workpiece surface comprising the steps of attaching a film having a thickness less than one-thousandth inch of electrically insulating material on said workpiece surface, attaching by the steps of atomization and deposition a film of electrically conducting material having a thickness less than one and one-half millionth inch on said insulating film, and connecting lead-in wires to said electrically conducting film.

5. The method of making a strain gage directly on a workpiece surface comprising the steps of attaching a microscopically thin film of electrically insulating material on said workpiece surface, atomizing different metals to form fluent particles thereof, depositing said particles on said insulating material in a single microscopically thin metallic film, and attaching connecting wires to said metallic film.

6. An electrical strain gage for strain measurement in workpieces comprising a strip of electrically insulating material adapted for intimate attachment to the workpiece, a thin film strip of electrically conducting material closely adherent to said insulating strip, and electric terminals secured to said conducting strip, said insulating strip having a thickness less than one-thousandth inch and said conducting strip having a thickness less than one and one-half millionth of an inch.

References Cited in the file of this patent

UNITED STATES PATENTS

| | | |
|---|---|---|
| 1,784,611 | Polyanyi et al. | Dec. 9, 1930 |
| 2,380,514 | Germeshausen | July 31, 1945 |
| 2,493,745 | Blodgett et al. | Jan. 10, 1950 |
| 2,589,983 | Blodgett et al. | Mar. 18, 1952 |
| 2,621,276 | Howland | Dec. 9, 1952 |

FOREIGN PATENTS

| | | |
|---|---|---|
| 342,300 | Great Britain | Jan. 28, 1931 |